US005087166A

United States Patent [19]

Honegger

[11] Patent Number: 5,087,166

[45] Date of Patent: Feb. 11, 1992

[54] HANDLING VEHICLE FOR PRINTED PRODUCT REELS

[75] Inventor: Werner Honegger, Tan Rüti, Switzerland

[73] Assignee: SFT AG Spontanfördertechnik, Weinfelden, Switzerland

[21] Appl. No.: 552,423

[22] Filed: Jul. 13, 1990

Related U.S. Application Data

[63] Continuation-in-part of Ser. No. 277,609, Nov. 29, 1988, abandoned.

[30] Foreign Application Priority Data

Nov. 30, 1987 [CH] Switzerland ........................ 04713/87

[51] Int. Cl.[5] .......................... B65G 74/90; B66F 9/18

[52] U.S. Cl. .................................... 414/458; 414/495; 414/544; 414/546; 414/631; 414/664; 414/665; 414/911

[58] Field of Search ............... 414/282, 283, 458, 459, 414/460, 495, 541, 544, 546, 549, 555, 631, 641, 663, 664, 665, 908, 910, 911

[56] References Cited

U.S. PATENT DOCUMENTS

| | | | |
|---|---|---|---|
| 2,490,685 | 12/1949 | Green | 414/911 X |
| 2,634,875 | 4/1953 | Trautner | 414/663 |
| 2,737,303 | 3/1956 | Held et al. | 414/911 X |
| 2,840,219 | 6/1958 | Mervyn et al. . | |
| 2,918,186 | 12/1959 | Cirillo . | |
| 3,167,201 | 1/1965 | Quayle | 414/664 |
| 3,558,172 | 1/1971 | Lamer et al. | 294/67 |
| 3,643,825 | 2/1972 | Zane, Jr. . | |
| 3,726,425 | 4/1973 | Terho et al. . | |
| 3,730,368 | 1/1973 | Dalglish . | |
| 3,734,328 | 5/1973 | Dalglish . | |
| 3,739,931 | 6/1973 | Bowman-Shaw . | |
| 3,747,790 | 7/1973 | Smith, Jr. | 414/664 X |
| 3,794,196 | 2/1974 | Terho et al. . | |
| 3,858,735 | 1/1975 | Zrostlik . | |
| 3,930,585 | 1/1976 | Lynch . | |
| 3,951,287 | 4/1976 | Cofer . | |
| 4,153,211 | 5/1979 | Lenk et al. . | |
| 4,326,830 | 4/1982 | Cusack | 414/544 X |
| 4,331,419 | 5/1982 | Perrott | 414/283 |
| 4,354,793 | 10/1982 | Perry | 414/546 |
| 4,375,936 | 3/1983 | Dechantsreiter | 414/910 X |
| 4,596,506 | 6/1986 | Burgardt et al. | 414/426 |
| 4,641,795 | 2/1987 | Honegger | 414/910 X |
| 4,682,929 | 7/1987 | Kataoka | 414/911 X |
| 4,718,813 | 1/1988 | Kehlenbach | 414/684 |
| 4,723,884 | 2/1988 | Brinker et al. . | |
| 4,777,781 | 10/1988 | Doster et al. . | |
| 4,783,021 | 11/1988 | Nagasawa | 414/908 X |
| 4,830,568 | 5/1989 | Maccaferri | 414/910 X |
| 4,856,960 | 8/1989 | Wheeler et al. | 414/910 X |
| 4,877,365 | 10/1989 | Lanigan, Jr. et al. | 414/459 |
| 4,934,413 | 6/1990 | Yao | 414/911 X |
| 4,941,798 | 7/1990 | Meier | 414/619 |

FOREIGN PATENT DOCUMENTS

| | | | |
|---|---|---|---|
| 671776 | 10/1963 | Canada . | |
| 34395 | 8/1981 | European Pat. Off. . | |

(List continued on next page.)

OTHER PUBLICATIONS

Mechanical Handling, Jun. 1968, p. 961 (Sideloading for Containers by Lancer Boss, Shelvoke & Drewry and Henley Forklift Co.).

*Primary Examiner*—Robert J. Spar
*Assistant Examiner*—Robert S. Katz
*Attorney, Agent, or Firm*—Walter C. Farley

[57] ABSTRACT

A handling vehicle is used for the interchanging or replacement of printed product reels and empty reel cores. The vehicle body has a substantially U-shaped frame in plan. On the frame is a structure (1), into which is integrated a working module (35) with a vertically adjustable manipulating device (4). This working module is movable at right angles to the vehicle body (2) and is arranged in the central area of the vehicle body. Longitudinally spaced from the working module (35) is a laterally movable gripping arm (12) fixed to the structure (1) on the vehicle body (2). The working module (35) is used for the handling and transportation of printing product reels (8) and the gripping arm (12) for handling and transporting empty reel cores (50).

12 Claims, 5 Drawing Sheets

FOREIGN PATENT DOCUMENTS 2541190 3/1977 Fed. Rep. of Germany .
2734024 2/1979 Fed. Rep. of Germany .
2590882 6/1987 France ............................... 414/665
613488 12/1960 Italy .................................. 414/631
59-38176 3/1984 Japan .
61-207257 9/1986 Japan .
61-211229 9/1986 Japan .................................. 414/908
62-4630 1/1987 Japan .
62-280120 12/1987 Japan .................................. 414/908
8300147 8/1984 Netherlands .
635036 11/1978 U.S.S.R. .
1042831 9/1983 U.S.S.R. .............................. 414/908
890877 3/1962 United Kingdom .
1455636 11/1976 United Kingdom .

HANDLING VEHICLE FOR PRINTED PRODUCT REELS

CROSS-REFERENCE TO RELATED APPLICATION

This is a continuation-in-part of Ser. No. 277,609 filed Nov. 29, 1988 and now abandoned.

FIELD OF THE INVENTION

The invention relates to a handling vehicle, particularly for manipulating and transporting large printing product reels and rolls in the printing field.

BACKGROUND OF THE INVENTION

The reduction of the working steps and rationalization desired in modern production and manufacturing sequences has led to increased transportation and manipulation problems in connection with heavy process-specific products which are combined to form large units. Of late, in the printing field, printing products have been wound or rolled onto a reel or roll core, which permits very rapid working sequences and permits the intermediate storage of such printing products, without having to modify the sequential arrangement thereof. The number of printing products wound onto such a roll core is fundamentally only limited by the necessary strength of the finished reel. Because the replacement of such reels, or their transportation into the warehouse or store from one process line to another, generally takes place manually, obviously using auxiliary equipment, every effort is made to handle or manipulate reels of maximum size, so as to reduce the number of working steps. Already rolls with diameters of up to approximately 1.5 m and with weights of over 1 or 2 tons each are used. When manipulating such bulky loads, with their considerable weight, serious problems occur in connection with the stability or the handling vehicle and, as a result of the difficulty in handling the large rolls, also during stacking, storage and transportation. In addition, it is desirable for it to be possible to manipulate the loads to achieve a space-saving storage procedure for printing product reels. Where, as a result of the necessary strength of such rolls, their size is limited, the manipulation vehicle must permit a maximum-speed operating sequence and a high manipulating frequency.

Therefore, there is need for handling vehicles which, on the one hand, permit manipulation of the printing product reels in confined space conditions and, on the other, allow rapid replacement of the reels at working stations.

Conventional transverse fork lift trucks and four-way fork lift trucks are not able to correctly transport heavy printing product reels and, in particular, fail to meet the demands made in connection with the handling and replacement of reels. A transverse fork lift with vertically adjustable forks is e.g. known from DE-OS 25 41 190. Each fork lift has a longitudinal component and two other components pivotally connected thereto. However, as a result of its design, the vehicle is wide, so that it cannot be correctly used in the confined storage and working space conditions in printing works. It is also unable to grasp and transport in a stable manner printing product reels which have a considerable weight and special dimensions.

Canadian patent 671 776 also discloses a transverse fork lift which has two lifting posts. However, it is not in a position to handle and transport in the desired manner large printing product reels. Although in this case two lifting posts are provided, it is not possible to replace printing product reels with empty reel cores at the winding stations. In addition, said means also has a construction which is much too wide.

SUMMARY OF THE INVENTION

An object of the invention is to provide a handling vehicle which, while having a narrow, space-saving and tilt-stable construction, permits precise handling of printing product reels and allows rapid replacement of such reels and empty reel cores.

Briefly described, the invention comprises a handling vehicle for printed product reels including a generally U-shaped frame having end portions, a central, substantially open region and a longitudinal central axis. Rolling means, such as rollers or wheels, movably support the frame for movement in a longitudinal direction parallel with the longitudinal axis. A working module includes support means for a printed product reel. Means on the frame support the module and moves it perpendicularly to the longitudinal direction between a first position in which the module is in the central region of the frame and a second position in which the module is extended laterally of the frame so that the support means can engage and support a reel a predetermined lateral distance from a side of the frame. A gripping arm is mounted on the frame longitudinally spaced from the support structure, and means is provided for extending the gripping arm laterally of the frame so that the arm can engage and support an empty printed product roll a lateral distance from the side of the frame substantially equal to the predetermined lateral distance.

BRIEF DESCRIPTION OF THE DRAWINGS

The invention is described in greater detail hereinafter relative to an embodiment and the attached drawings, wherein.

DESCRIPTION OF THE PREFERRED EMBODIMENT

The subsequently described embodiment of the inventive handing vehicle serves as a changer for printing product reels in automated printing plants. Printing product reels are very critical loads as regards handling and transportation. They have very considerable weight of e.g. 2 to 4 tons and are to be transported and handled in freely suspended manner instead of being set down on a loading surface. For this reason it is not possible to use conventional transverse fork lifts for handling purposes. For logistical reasons it is also necessary for the working stations and storage area to be in confined spaces. Therefore a handling vehicle must have minimum dimensions, so that it can be manipulated in the narrow passageways. Conventional transverse fork lifts are also unusable for this reason, because they are much too wide.

The requirement of a narrow vehicle with small dimensions in combination with problems regarding loads, causes an additional difficulty with respect to the tilting stability thereof. It is readily apparent that a narrow transverse fork lift would tilt immediately if heavy loads in the form of printing product reels were raised on its forks, which must necessarily be positioned laterally of the vehicle.

A further difficulty is apparent when considering the operation of the vehicle. The situation used to be that individual working stations were served by two or more independent handling vehicles. However, if the individual working stations are positioned so close together that two vehicles cannot cross, the logistic concept must be changed. A single vehicle must then be in a position to carry out all necessary functions in its area.

The vehicle according to the invention makes it possible to replace full printing product reels under predetermined working conditions, so that a full reel is removed from a winding station and a new, empty reel core is inserted. Conversely, at another station or in a warehouse, it is possible to transfer a full reel and take up an empty reel core.

Figure 1:
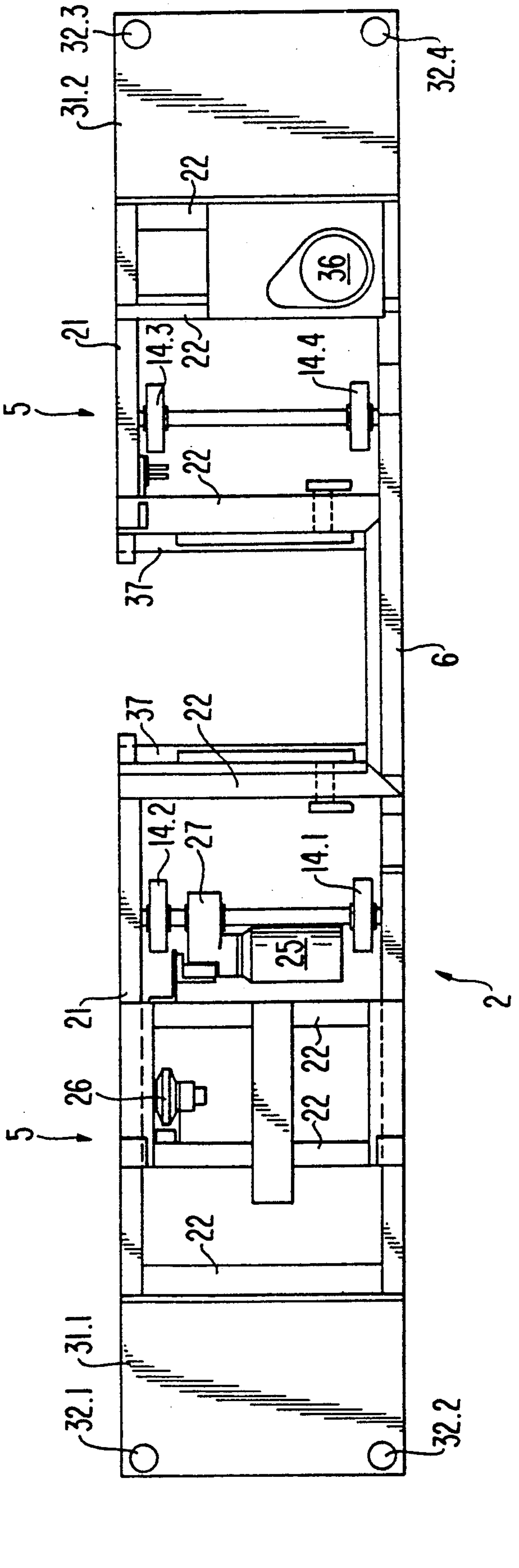
FIG. 1 is a top plan view of the vehicle body.
Figure 2:
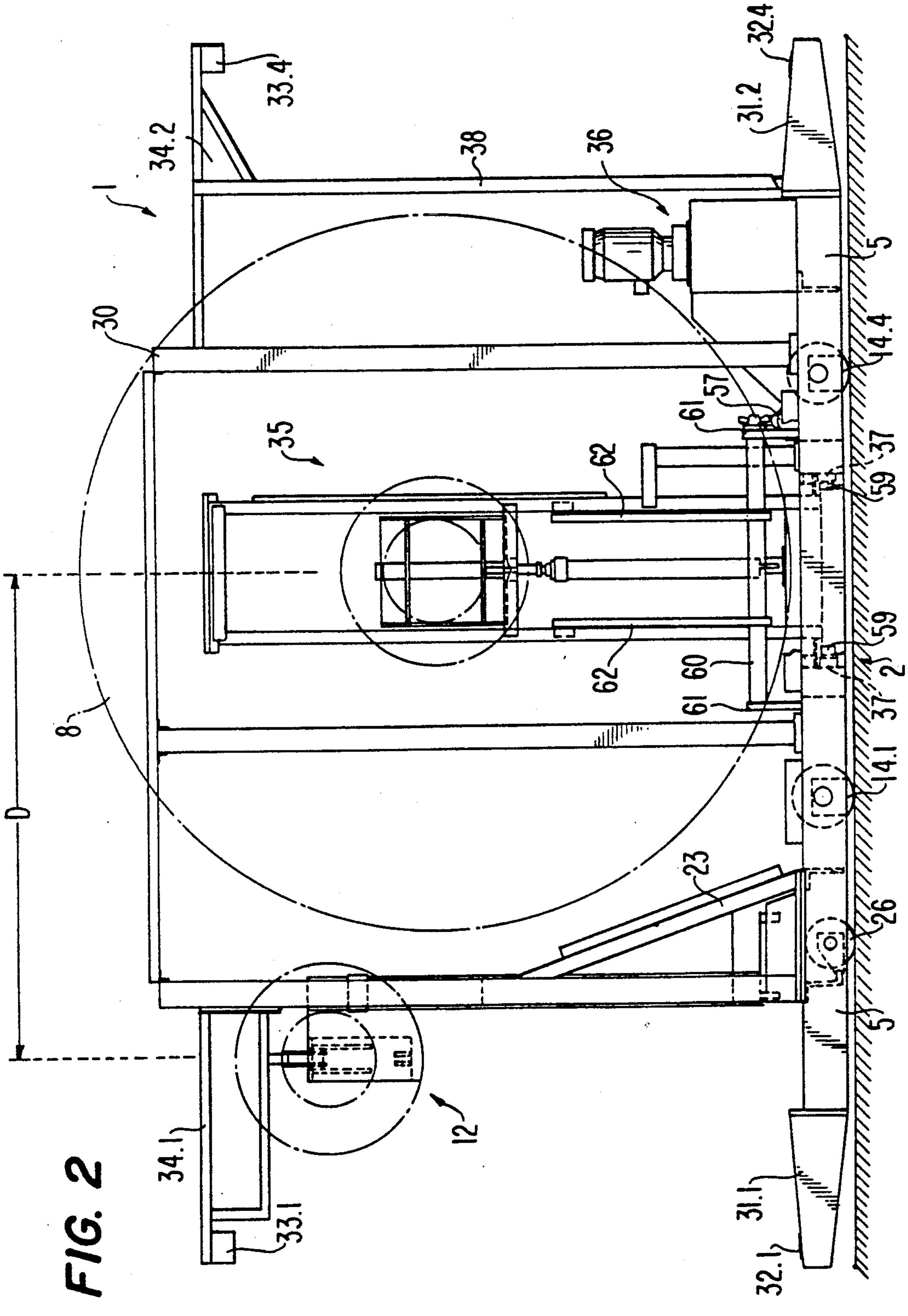
FIG. 2 is a front elevation of the vehicle of FIG. 1.

The vehicle body is shown in plan view in FIG. 1 and is substantially U-shaped. In order to bring about a narrow construction of the vehicle, the longitudinal frame part 6 of the vehicle body 2 is formed solely by a narrow beam or a narrow housing structure. The two transverse legs indicated generally at 5 in the present embodiment are formed by a construction of beams 21 positioned parallel to the direction of travel and a plurality of crossbeams 22. This permits a very flat or shallow construction of the vehicle body, i.e., the overall height of the handling vehicle (including the load) and therefore the center of gravity can be kept very low. Four wheels 14.1–14.4 are used for advancing the vehicle. The wheel axles are roughly in the center of the vehicle frame, so as to ensure adequate stability in the vicinity of the longitudinal frame part 6 with respect to the torsional moments and torques occurring in the loaded state. In the conventional way, two wheels 14.1 and 14.2 are driven by a motor 25, preferably an electric motor, and a transmission drive unit 27. If the handling vehicle need only carry out linear movements, the wheels are preferably guided in rails. If necessary, additional components 31.1, 31.2 can be installed on the two transverse legs 5 which, in the present embodiment, are constituted by buffer members. Each buffer member 31.1, 31.2 has two reflectors 32.1–32.4 for sensor-based monitoring during operation. The reflectors cooperate with a minimum of two sensors 33 positioned above the reflectors (FIG. 2). Such a buffer member 31.1,31.2 can also incorporate a driver's cab for special uses. There is also a further brake wheel 26 and a hydraulic drive 36.

FIG. 2 shows the vehicle in front elevation. The wheels 14.1–14.4 and the additional brake wheel 26 of vehicle body 2 are located on the ground. On the vehicle body 2 is provided a structure 1, which comprises a substantially rectangular frame structure 30. Into the structure 1 is integrated a movable working module 35, which receives a full reel 8 and can be moved at right angles to the vehicle. In turn, the working module 35 is moved by means of a movement mechanism 57, 60, 61 and 62, which will be explained with reference to FIG. 5. A gripping arm 12 is movably mounted on the structure 1. The construction and operation of the two manipulating devices 12 and 35 will be explained with reference to FIGS. 4A, 4B and 5. A brace 23 is used for stabilizing the structure 1 and supports the same with respect to the vehicle body 2 (cf. FIG. 4B). It is also easily possible to see in FIG. 2 the buffer members 31.1,31.2 connected to the transverse legs 5 and the hydraulic drive 36. In the upper area of the structure 1 four sensors 33.1 to 33.4 are fixed to the beam structures 34.1,34.2. An additional support 38 is provided for stabilizing the beam structure 34.2. The sensors operate in a conventional manner together with the reflectors 32.1–32.4 provided on the buffer members 31.1,31.2, e.g., as light barriers and serve to monitor the working area during vehicle operation. As a function of the place of use, this monitoring is used to protect objects and/or workers. In order to be able to move the working module 35 at right angles to the direction of travel, there are at least two guide profiles 37 on the inwardly facing sides of the transverse legs 5.

Figure 3B:
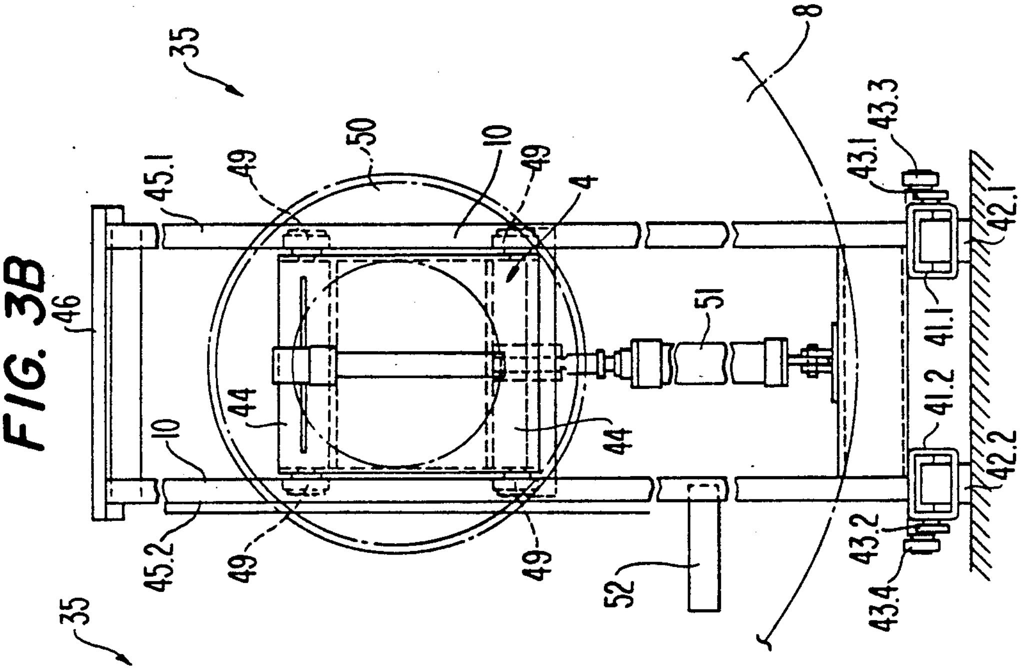
FIGS. 3A and 3B are side and front elevations, respectively, of working module for handling printing product reels from the side and the front.
Figure 3A:
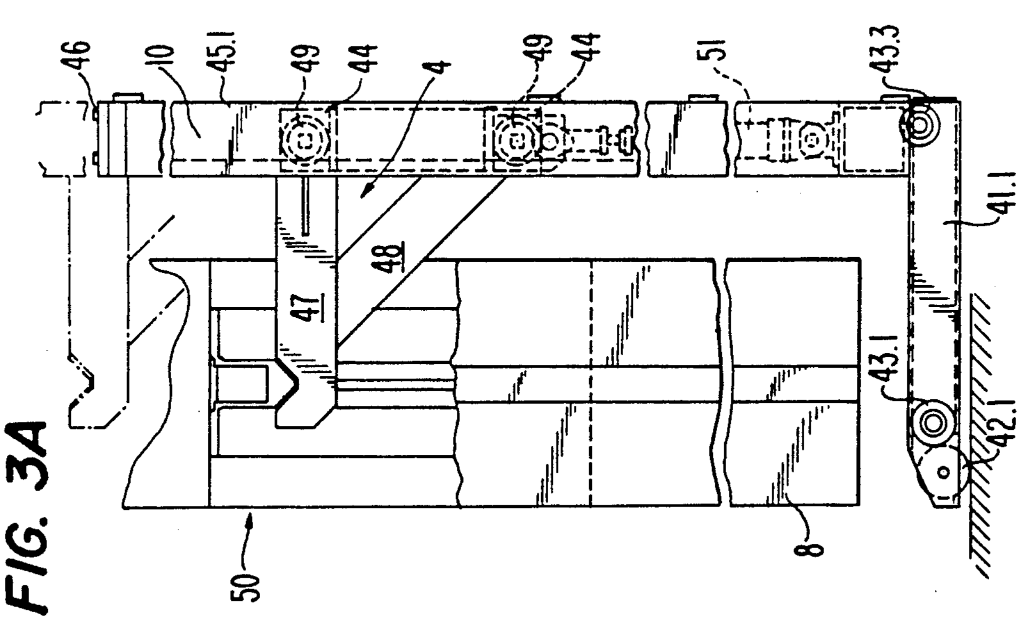

FIGS. 3A and 3B show the working module 35 and, to make understanding easier, it is shown detached from the vehicle. The module has two horizontal beams 41.1,41.2 on each of which is preferably mounted a traveling roller 42.1,42.2 and two or more guide rollers 43.1–43.4. The guide rollers 43.1–43.2 are guided in guide profiles 37 and make it possible to move the working module 35 at right angles to the vehicle body 2 (FIGS. 1 and 2). Two vertical supports 45.1,45.2 are fixed to the ends of the beams 41.1, 41.2 opposite from the ends carrying travelling rollers 42. Together with one or more cross-braces 46, these vertical supports 45 form a stable frame which makes it possible to vertically move the support structure 4 for a printing product reel in corresponding guide rails 10. In this embodiment the support structure includes a laterally extending, horizontal support arm 47 oriented at right angles to the direction of travel which is supported by a brace 48, as well as beam members 44. The support structure is guided in the guide rails 10 by means of the guide rollers 49. The vertical movement of the support structure can be carried out by means of a conventional hydraulic cylinder 51, which is driven by means of the hydraulic drive 36 (FIG. 2). The support arm 47 can enter the opening of a reel core 50. It is then possible to grasp a printing product reel 8 by raising the support structure 4, so that the weight of the reel bears by gravity on the support arm 47. The vertical movement can be limited by a lower stop member 52. Dot-dash lines in FIG. 3A indicate a second, upper position of the support structure 1. If necessary, the reel 8 can be transferred again at a selectable point. Obviously the working module can also contain other handling means, e.g., a manipulator according to U.S. Pat. No. 4,941,798.

Figure 4B:
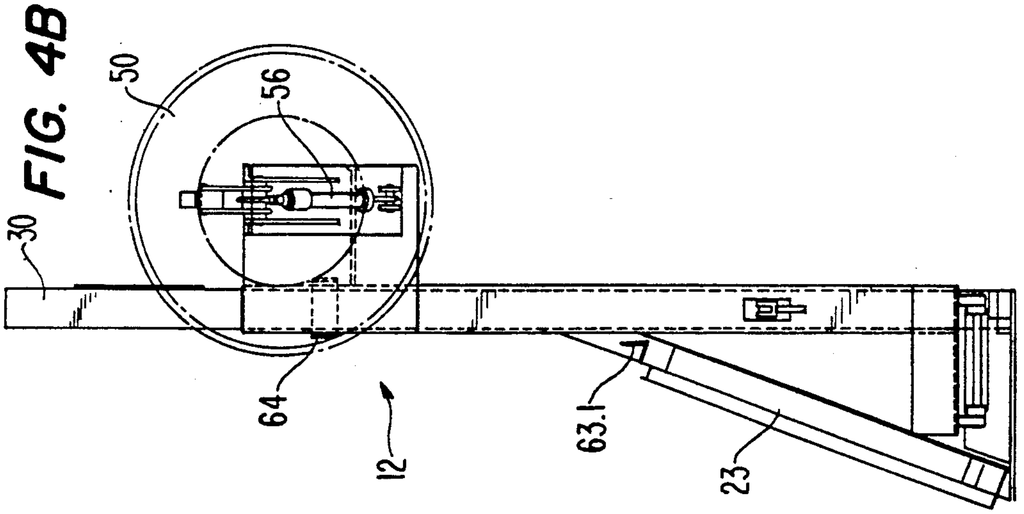
FIGS. 4A and 4B are side and front elevations, respectively, of a gripping arm for handling empty reel cores.
Figure 4A:
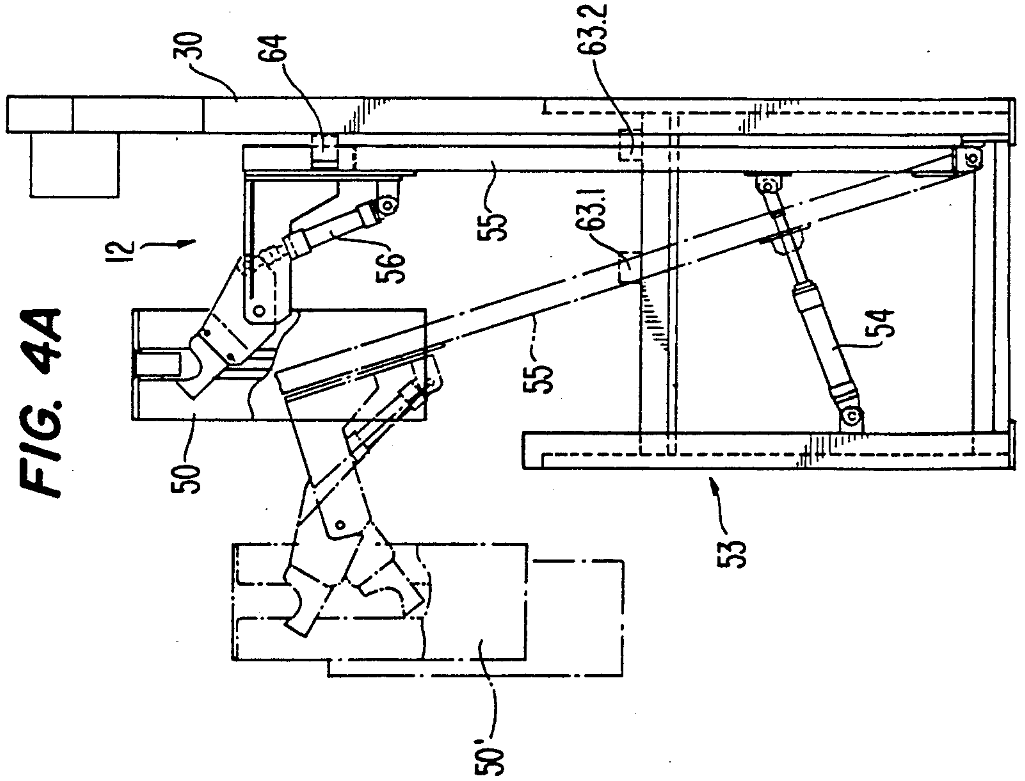

FIGS. 4A and 4B show in greater detail the gripping arm 12, which can grip an empty reel core. FIG. 4A shows how the frame structure 30 is additionally supported by means of a beam structure 53 in the movement direction of the gripping arm 12. One end of a hydraulic cylinder 54 is fixed in articulated manner to beam structure 53. The gripping arm 12, which is connected in an articulated manner to the frame structure 30 by means of a pivotable arm 55 having a pivot axis in the vicinity of the vehicle body, can be pivoted laterally by means of the hydraulic cylinder with respect to the frame structure or the vehicle. Dot-dash lines indicate the swung out position of the gripping arm 12, which can also be moved about a second pivot axis by an additional hydraulic cylinder 56. Thus, by operating hydraulic cylinder 56, an empty reel core 50' can be raised e.g. from a mounting support (not shown) when the gripping arm is positioned laterally of the vehicle in the swung out position. The empty reel core is kept in the vertical position during the swinging in of the gripping arm 12 as a result of the force of gravity. The gripping arm can then be swung in against the frame structure 30, so that in the transportation position the reel core 50 is located above the vehicle body. It is also possible to see the lateral brace 23 in the corresponding front view (FIG. 4B) of the gripping arm which in turn serves to stabilize the beam structure 53 or the structure 1. Two initiators 63.1,63.2 are used for determining the position of the gripping arm 12 or the pivoted arm 55. For example by means of a corresponding electric signal the operation of the hydraulic cylinder 54 can be positionably controlled and the gripping arm 12 can be brought into the desired handling or transporting position. The frame structure 30 carries a retaining member 64, here a U-profile, which secures the pivoted arm 55 during transportation or travel.

Figure 5:
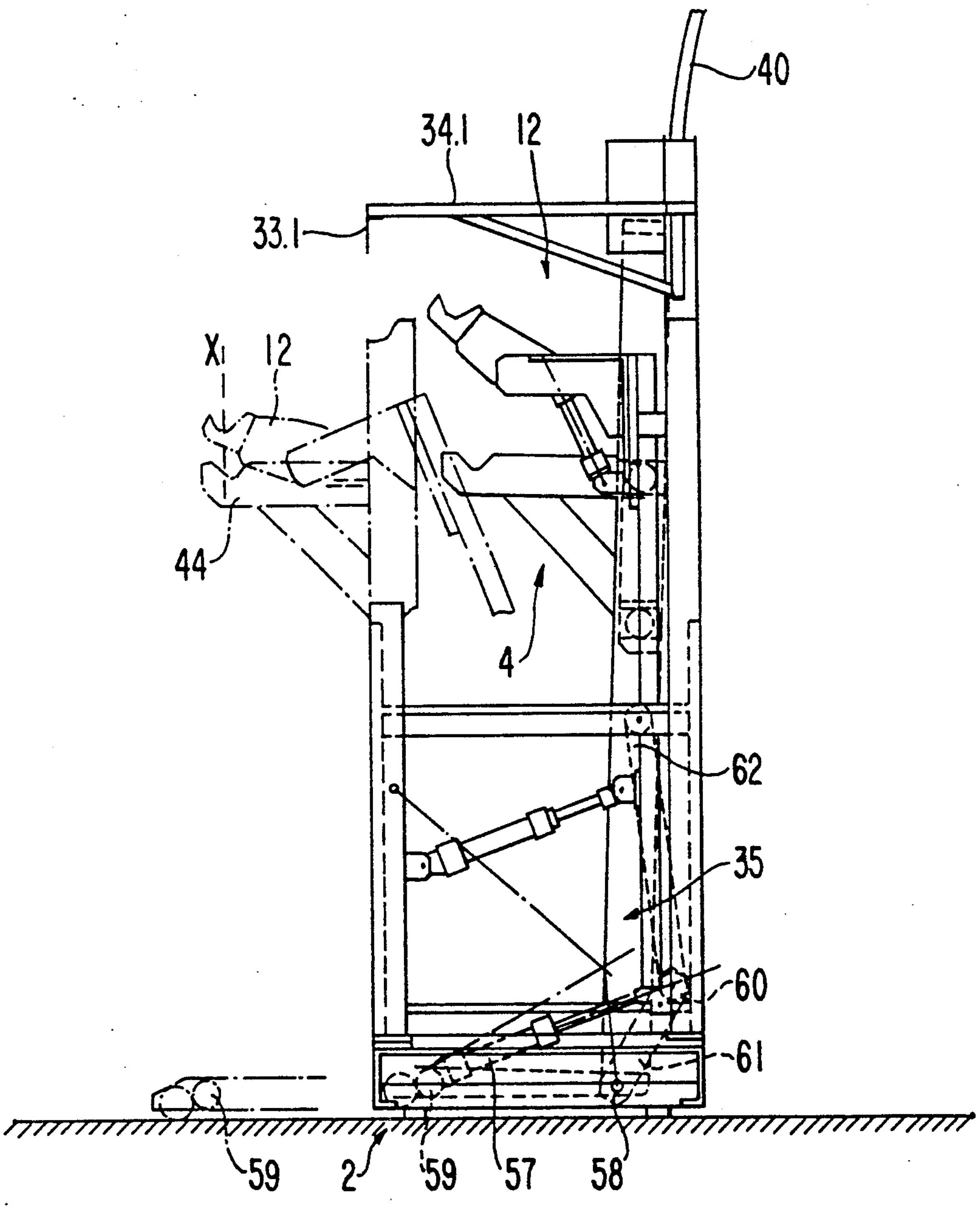
FIG. 5 is an end elevation of a vehicle in accordance with the invention.

FIG. 5 shows a side elevation of the vehicle including the working module 35 and the gripping arm 12. It is clearly possible to see the movement mechanism for moving the working module 35 in and out. A rod 60 is pivoted about an axis 58 by means of a hydraulic cylinder 57, also seen in FIG. 2. The rod 60 is pivotable about axis 58 by means of two short levers 61. To the rod 60 are fixed two long levers 62, at each of whose free ends is provided a guide roller 59. These guide rollers engage in a corresponding guide on the working module 35. If the hydraulic cylinder is operated in order to move the working module outwards at right angles to the vehicle, the rod 60 and therefore the lever 62 is pivoted laterally outwards and consequently the working module is moved towards the outside in the guide profiles 37. This construction of the actuating mechanism for the lateral extension of the working module 35 makes it possible, despite the narrow construction of the vehicle, to move a reel in the transportation position virtually into the center of the vehicle frame.

The guide profiles 37 are inclined slightly with respect to the horizontal, so that the guide rollers 42 ramp into gentle ground contact and the working module is supported in the outer position. As a result of this support of the working module in the extended position, it is possible to take up the very heavy printing product reels. The extended position indicated by dot-dash lines in FIG. 5. When the operation of the hydraulic cylinder 57 is reversed, the working module 35 can be correspondingly retracted into the transportation position on or in the vehicle body 2. As a result of the travelling rollers 42.1,42.2 which support the working module 35 in the extended position, the base of the narrow vehicle is stabilized and consequently the lateral tilting moment occurring during manipulation is counteracted.

As can also be gathered from FIG. 5, both of the gripping arm 12 and the supporting arm 47 must laterally be able to reach the same working point or a working area X at a distance of about 20 to 50 cm from the side of the frame in order to be able to interchange an empty reel core and a full reel at a working station.

Their orientation relative to the working point and the direction of travel of the vehicle is achieved by a vehicle movement by a distance D (FIG. 2). In order to permit a very fast change, that distance is minimized, i.e., the working module 35 and gripping arm 12 are arranged as close to one another as possible.

The power supply and control for this embodiment are ensured by electric leads and control lines 40. Thus, the vehicle can be operated or automatically controlled by means of a separate control console. The operation of the different hydraulic cylinders takes place through the aforementioned hydraulic drive 36. It is obviously possible to modify the arrangement of the hydraulic cylinders. What is important is that the gripping arm 12 and the working module 35 perform the described movements and can reach the same lateral working area X. The latter is preferably approximately 20 to 50 cm laterally of the vehicle, so that the reels can be interchanged in the winding stations. Corresponding to the need for a space-saving construction on the one hand and the nature of the loads to be manipulated on the other, the manipulating units are movable laterally over the vehicle frame. However, it is possible to handle the very heavy printing product reels with the inventive vehicle with at least one working module. The handling vehicle ensures a stable handling and reliable transportation of the heavy printing product reels. Great importance is attached to the fact that the vehicle has a narrow construction and can therefore be used in confined storage conditions. Preferably, the vehicle (including its manipulation means) has a width (perpendicular to its longitudinal axis) of less than 0.8 m.

The inventive concept is based on the fact that the vehicle, with a space-saving construction, allows a replacement or interchange of printing products reels and empty reel cores. As the printing product reels are very heavy, which makes reliable handling and tilt-stable transportation much more difficult, and also have large dimensions (diameters up to approximately 2.5 m), the handling vehicle must have an optimum construction with respect to the manipulation movements and the transport positioning of the loads. The working module 35, which is used for manipulating the printing product reels and secures the same during transportation, is consequently arranged in the central area relative to the vehicle longitudinal direction, so that the center of gravity is essentially in the center between the two transverse legs or the two vehicle transportation axles. The gripping arm 12 for the empty reel cores is displaced by a distance D with respect to the working module 35 and to ensure that it is at a minimum it is matched to the diameter of the printing product reel and is separated from arm 47 by, e.g., 1.7 m. During transportation, the invention aims at ensuring that the center of gravity of the printing product reel (or the overall center of gravity of the vehicle) is as low as possible and is positioned centrally with respect to the vehicle body as seen in plan view. Thus, the working module 35 is designed in such a way that, in the transportation position, it can be moved back between the two transverse legs 5 adjacent to the longitudinal frame part 6 and therefore, based on the vehicle width, the center of gravity of the load is located in the central area.

With respect to the handling operations, the working module 35 and the gripping arm 12 must be operable independently of one another, but reciprocally coordinated. Thus, it must be ensured that when a reel is replaced by an empty reel core at a winding station, e.g., a reel can firstly be taken over by the handling vehicle and immediately thereafter an empty reel core can be transferred to the winding station. This is ensured by the inventive vehicle, in that between those two working steps the vehicle is moved by a distance D between the working module and the gripping arm. After the empty reel core has been transferred to the winding station, the vehicle can be moved to another winding station or into the warehouse, where once again the full reel is deposited and an empty reel core can be made ready on the gripping arm.

The handling vehicle can be automatically controlled and requires no human operator. However, it is obviously also possible to provide a driver's cab, including controls on the vehicle.

For special application, additional movement possibilities can be provided for the gripping arm and the support structure 4. For example the gripping arm can be rotatable with respect to the pivoted arm 55, so that the reel cores can be taken up from special positions by the gripping arm.

What is claimed is:

1. A handling vehicle for transferring empty and full printed product reels from an external source comprising the combination of a generally U-shaped frame having end portions, a central, substantially open region defined within said U-shaped frame and a longitudinal central axis;

rolling means for movably supporting said frame for movement in a longitudinal direction parallel with said axis along a support surface;

a working module (35) including support means (4) for supporting a printed product reel;

track means on said frame for supporting said module and moving said module horizontally perpendicularly to said longitudinal direction between a first position in which said module is in said central region of said frame and a second position in which said module is extended laterally of said frame so that said support means can engage, lift, and support a full printed product reel a predetermined lateral distance from a side of said frame;

a gripping arm separate from said nodule, pivotally mounted on said frame longitudinally spaced from said module and said track means, and extending means for extending said gripping arm laterally of said frame so that said arm can engage, lift, and support an empty printed product reel a lateral distance from said side of said frame substantially equal to said predetermined lateral distance.

2. A vehicle according to claim 1 wherein said predetermined distance is between about 20 cm and 50 cm from said side of said frame.

3. A vehicle according to claim 2 wherein said support means comprises a vertically movable support arm for engaging and moving a printed product reel.

4. A vehicle according to claim 3 wherein said working module includes travelling roller means for engaging the ground and supporting and stabilizing said module in said second position.

5. A vehicle according to claim 4 wherein said extending means for extending said gripping arm includes a support frame pivotally mounted on said working module adjacent said U-shaped frame, said gripping arm being mounted at a distal end of said support frame.

6. A vehicle according to claim 5 wherein the horizontal longitudinal spacing between said gripping arm and said support structure is between about 1.5 m and 2 m.

7. A vehicle according to claim 6 wherein the maximum horizontal dimension of said U-shaped frame perpendicular to said longitudinal axis is about 0.8 m.

8. A vehicle according to claim 1 wherein said support means comprises a vertically movable support arm for engaging and moving a printed product reel.

9. A vehicle according to claim 1 wherein said working module includes travelling roller means for engaging the support surface and supporting and stabilizing said module in said second position.

10. A vehicle according to claim 9 wherein said means for extending said gripping arm includes a support frame pivotally mounted on said working module adjacent said U-shaped frame, said gripping arm being mounted at a distal end of said support frame.

11. A vehicle according to claim 10 wherein the horizontal longitudinal spacing between said gripping arm and said support structure is between about 1.5 m and 2 m.

12. A vehicle according to claim 1 wherein the maximum horizontal dimension of said U-shaped frame perpendicular to said longitudinal axis is about 0.8 m.

* * * * *